INVENTOR.
ANTHONY D. RICIGLIANO
BY Meyer A. Baskin
ATTORNEY.

Jan. 9, 1968 A. D. RICIGLIANO 3,362,888
REVIVIFYING CARTRIDGE FILTERS
Filed Oct. 1, 1964 4 Sheets-Sheet 2
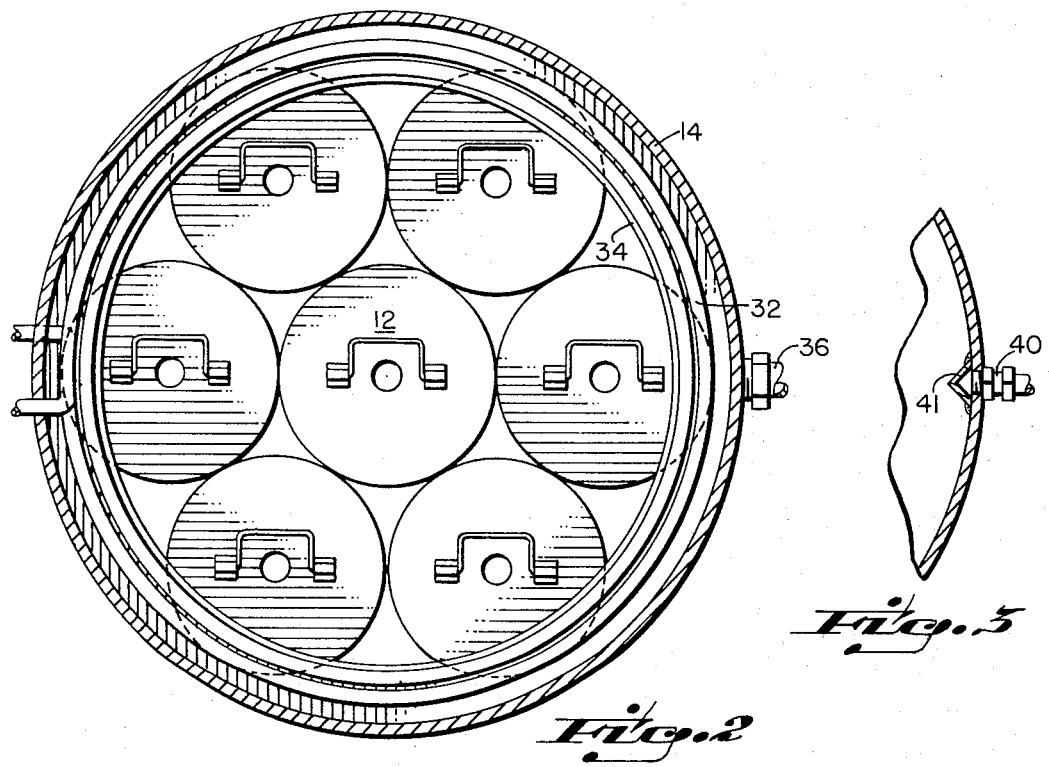
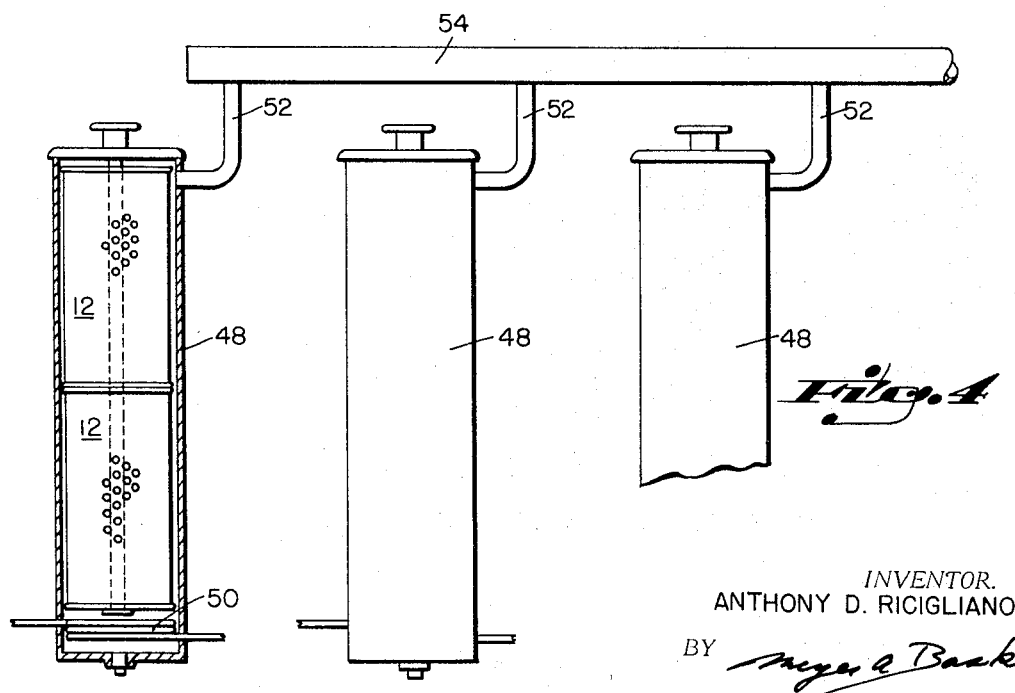
INVENTOR.
ANTHONY D. RICIGLIANO
BY
ATTORNEY.

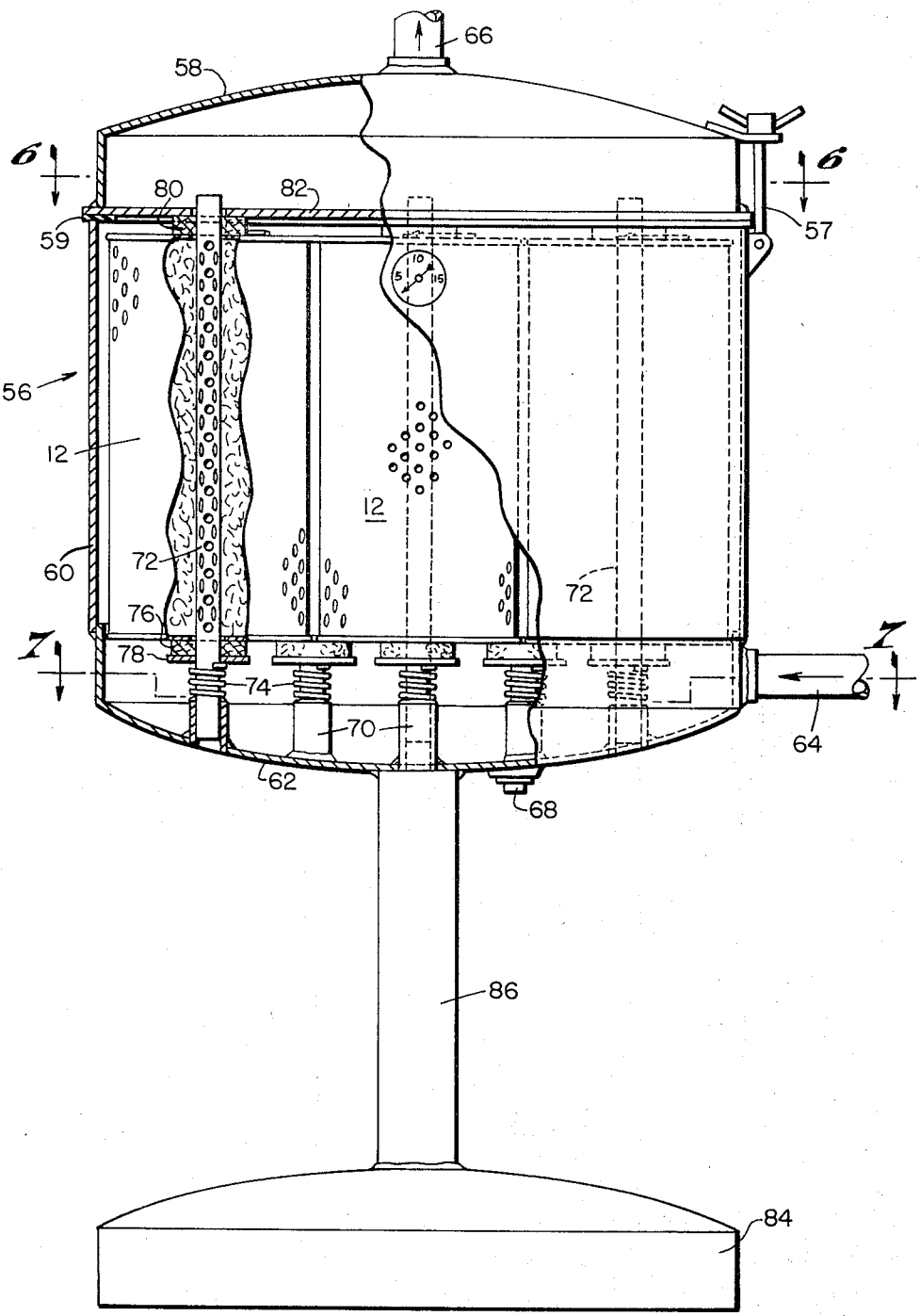

Jan. 9, 1968 A. D. RICIGLIANO 3,362,888
REVIVIFYING CARTRIDGE FILTERS
Filed Oct. 1, 1964 4 Sheets-Sheet 4
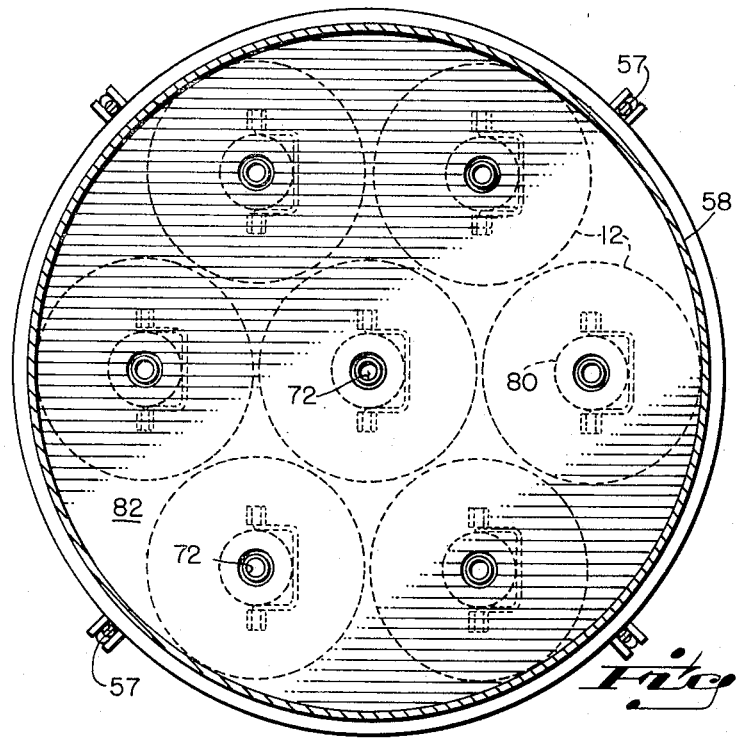
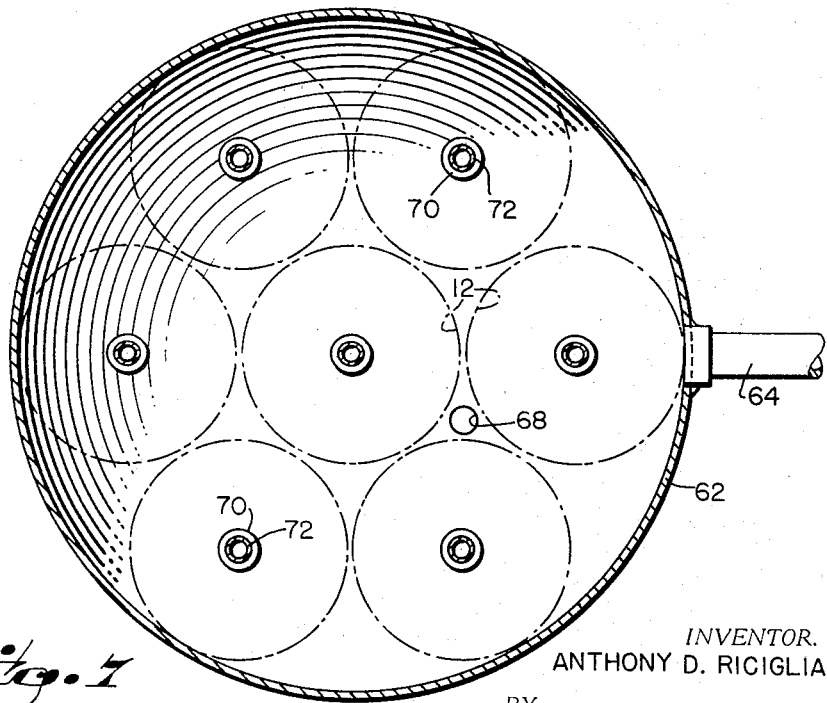
INVENTOR.
ANTHONY D. RICIGLIANO
BY
ATTORNEY United States Patent Office 3,362,888
Patented Jan. 9, 1968

3,362,888
REVIVIFYING CARTRIDGE FILTERS
Anthony D. Ricigliano, Miami, Fla., assignor of one-third to Sam J. Heiman and one-third to Albert E. Lichenstein, both of Miami, Fla.
Filed Oct. 1, 1964, Ser. No. 400,710
3 Claims. (Cl. 202—190)

The present invention is generally concerned with new and useful improvements in the dry cleaning art and, more particularly, relates to novel means and methods for the revivification of filters and the recovery of dry cleaning fluid such as perchlorethylene, usually known as perk or trichlorethylene, or other chlorinated, fluorinated, or halogenated hydrocarbons, or hydrocarbons therefrom.

As will be appreciated by those familiar with the art, the extremely expensive nature of the normally used dry cleaning solvent perchlorethylene has resulted in the use of various types of filters or filtering systems which enable a recirculation of the solvent, thereby effecting substantial economies. These filters, however, generally have a limited useful life resulting from an accumulation of filtered dirt, fats, oils, etc., which in turn produce a blockage which prevents passage of the solvent and causes a build-up of a detrimental high back pressure. Normally, at this point the filter is thrown away. To do so however, involves a substantial expense in addition to the cost of the filter in that during the filtering operation, a large amount of perchlorethylene, generally between one and two gallons of perk, is retained by or entrained in the filter.

Accordingly, it is a primary object of the instant invention to effect both a revivification of dry cleaning solvent filters and a recovery of the entrained solvent.

This is basically achieved through the utilization of a unique steam or recovery tank within which the used filters are placed and subjected to a vaporized solvent, this solvent being the same type as that which the filters were filtering. The solvent, which is generally perchlorethylene, is vaporized by steam coils located in the bottom of the chamber. As the vaporized solvent rises through the filters, it attacks and destroys the sludge on the filters, the sludge drops away from the filters and is subsequently removed through a drain pipe. Thus, a revivification of the filters results, the entrained solvent remaining in the filters inasmuch as the filters are now to be reused. However, when the filters are no longer capable of being revived, due to physical deterioration of the filter, they are subjected to vaporized water or steam which effects the recovery of the entrained solvent by, in effect, steam distilling the solvent as the steam rises through the filters. The vapor steam mixture is subsequently condensed, the water and solvent separated, and the solvent recovered.

Another significant object of the instant invention is to provide a novel filter housing wherein a plurality of cartridge filters can be quickly clamped and sealed in operative position. The same filter housing can also be used for the vapor phase revivification of the filter cartridges.

These and other objects and advantages which reside in the invention will become apparent from the following detailed description wherein like numerals refer to like parts, and FIGURE 1 is a vertical cross-sectional view through the recovery tank of the instant invention;

FIGURE 2 is a cross-sectional view taken substantially on a plane passing along line 2—2 of FIGURE 1;

FIGURE 3 is a partial cross-sectional view illustrating a detail of the tank of FIGURE 1;

FIGURE 4 is a schematic view of a modified form of apparatus which can be utilized in the practice of the methods of the instant invention;

FIGURE 5 is an elevational view of the filter housing of the instant invention;

FIGURE 6 is a cross-sectional view taken substantially on a plane passing along line 6—6 in FIGURE 5; and FIGURE 7 is a cross-sectional view taken substantially on a plane passing along line 7—7 in FIGURE 5.

Figure 1:
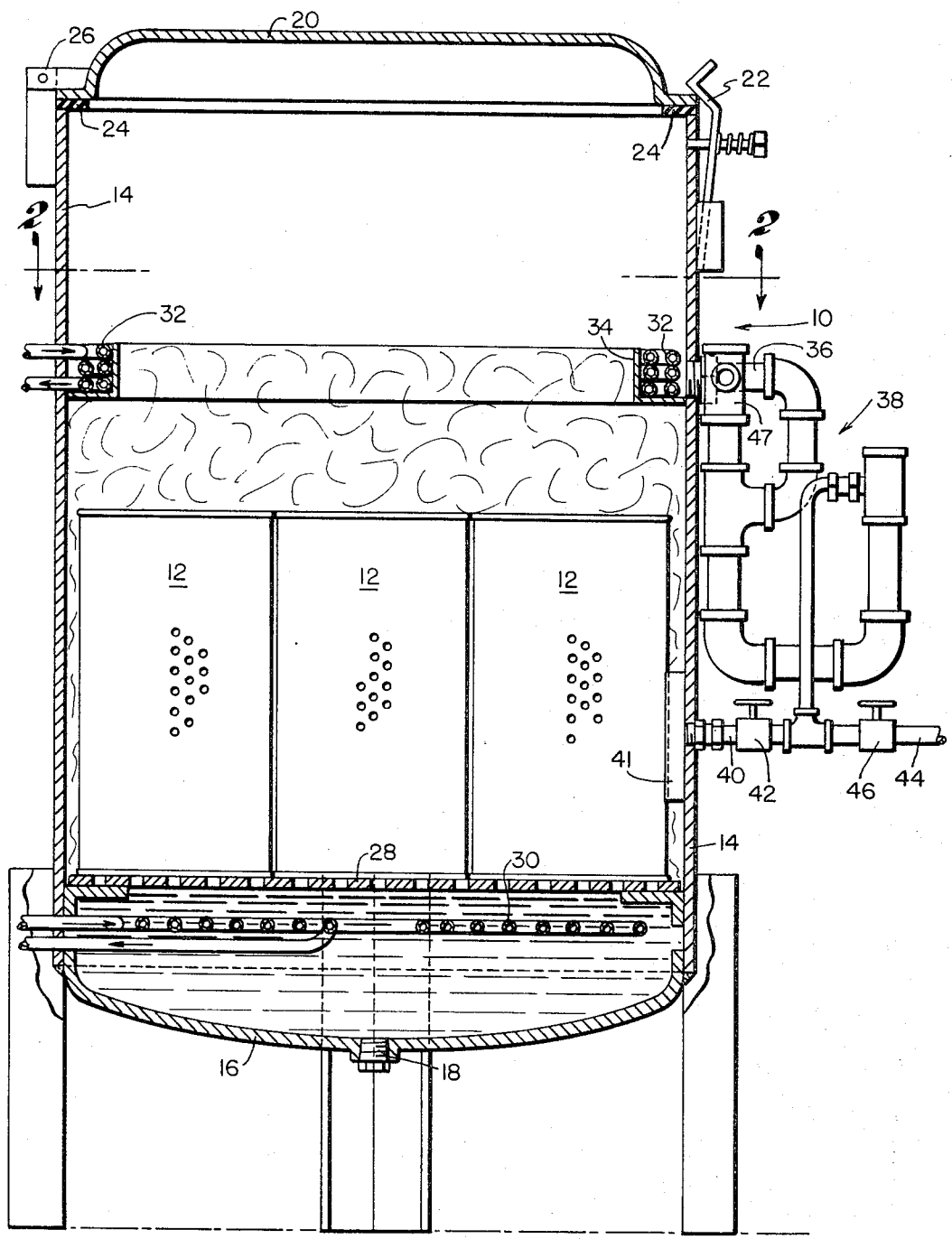

Referring now more specifically to the drawings, and in particular FIGURE 1, reference numeral 10 is used to generally designate the cooker or recovery tank within which a plurality of used or dirt-ladened cartridge filters 12 are placed to be subsequently revivified. The tank 10 basically includes a cylindrical wall 14, a draining bottom wall 16 sealed to one end of the cylindrical wall 14 and provided with a drain plug 18, and a top wall or cover 20 removably clamped to the other end of the cylindrical wall 14. Sufficient clamps 22 are provided so as to insure, in conjunction with a sealing gasket 24, an air tight sealing of the cover 20 to the wall 14. If so desired, the cover 20 can also be hinged, as at 26, to the wall 14, thus allowing the cover 20 to merely pivot to one side when loading or unloading the cartridge filters 12.

A flat perforated baffle plate 28 is fixed within the tank 10 in spaced relation above the bottom wall 16 so as to form a supporting floor for the filters 12. Mounted below the baffle plate floor 28 are heating or steam coils 30, the entry and exit flow therethrough being generally indicated by the arrow lines in FIGURE 1.

The upper end of the tank 10 is provided with cooling coils 32, the arrows in FIGURE 1 illustrating the flow of coolant therein. The cooling coils 32 are located in an upwardly opening annular chamber 34 provided peripherally about the interior of the cylindrical wall 14 below the upper end thereof. A valve controlled discharge pipe 36 is communicated with the cooling chamber 34 so as to receive condensate, as shall be described presently.

The discharge pipe 36 extends to a separate unit, generally called a separator, referred to at 38, which in turn has a first discharge line 40 returning to the tank 10 and controlled by valve 42, and a second discharge line 44 extending to a solvent reservoir, not shown, and controlled by valve 46. It will be noted that deflector 41 is provided over the inner end of the pipe 40 within the tank 10. Separated water is carried off via opening 47 to drain.

The above described apparatus is highly useful in the performance of two processes, the revivification of sludge-ladened filters, and the recovery of the solvent from filters no longer capable of being revivified.

In the revivification process, the tank 10 is filled with just sufficient solvent, of the type used in the cleaning process, usually perchlorethylene, to cover the steam coils 30. The dirty filters 12 are positioned within the tank 10 on the baffle floor 28, and the solvent subsequently vaporized by steam in coils 30. The solvent, in vapor phase, preferably at about 245° F., rises about the filters 12 and attacks the sludge film consisting of dirt, fats, oils, etc. which have accumulated on the filters 12, causing this sludge film to drop to the bottom of the tank 10, through the floor 28, where it is removed by means of the drain 18.

The vaporized solvent is subsequently condensed on the cooling coils 32 and discharged through the discharge pipe 36. Until the revivification process is complete, the condensed solvent is reintroduced into the tank 10 via the separator 38 toward the bottom thereof through the pipe 40, valve 42 being open and valve 46 being closed. Upon completion of the revivification process, valve 42 is closed and valve 46 is opened so as to drain off the condensed solvent to a reservoir and the filters 12 are removed and reused. Inasmuch as the filters 12 are to be reused, there is no necessity to remove any solvent which might still be entrained therein.

When the filters 12 can no longer be effectively revivified or regenerated, the apparatus described above is used to strip the entrained solvent therefrom prior to disposing of the filters 12. This is accomplished using water, or live steam, as a recovery agent. Water is placed in the bottom of the tank 10 sufficient to cover the coils 30, the filters 12 placed on the floor plate 28, and the water vaporized by putting high pressure steam into coils 30. The water in vapor phase rises about the filter 12 evaporating the solvent and carrying the captured solvent with it to the cooling coils 32 where condensation occurs.

The condensate is then discharged through the discharge pipe 36 into a suitable separator apparatus 38 for removal of the water, the recovered solvent being drained off through pipe 44, valve 46 being open and valve 40 being closed. The filters 12 can then be disposed of without the expensive loss of solvent normally encountered.

When a small operation is involved, the above described methods can be performed within the standard capped filter cartridge containers 48 of the type shown in FIGURE 4. These containers normally hold one or two filters 12. In FIGURE 4 two filters 12 are shown in each container 48.

In order to use the revivification method of this invention, the container 48, in addition to having the usual solvent circulating piping, not shown, attached, includes a steam coil 50 mounted within the lower end thereof below the lower filter 12, and a conduit 52 extending from the upper portion of the container 48 to a common condenser 54. The condenser 54 in turn is selectively communicated with a separating apparatus and a solvent reservoir, not shown. If so desired, a valved pipe can be provided for re-circulating the condensed solvent back to the lower end of the container 48 until the revivification process of the filters 12 is complete, as in the apparatus of FIGURE 1.

The instant invention contemplated the use of a series of these containers 48 with all the containers 48 being selectively communicated with the common condenser 54, thereby enabling the use of one or more of the containers as recovery tanks or cookers while the rest are being used in the manner of conventional filters associated with a cleaning machine. In this manner, a continuous operation of a cleaning machine, or machines, is possible.

Referring now specifically to FIGURES 5, 6 and 7, it will be noted that a novel filter housing 56 has been disclosed. This housing 56 is particularly adapted to mount a plurality of cartridge filters 12 in communication with a common manifold dome 58 with the filters 12 resiliently clamped into position. The housing 56 itself consists of a cylindrical wall 60, a rounded permanent bottom wall 62 having a drain 68 therein, and the manifold dome or top 58, which is removably clamped to the upper end of the cylindrical wall by a plurality of clamps 57 positioned peripherally thereabout, a suitable sealing gasket 59 also being used. Solvent inlet and outlet pipes 64 and 66 are, of course, provided for communicating the housing with a dry cleaning machine, not shown.

Fixed to the bottom wall 62 and projecting upwardly therefrom into the interior of the housing 56 are a plurality of tubular mounts 70. Each of these mounts 70 telescopically receives the lower end of a perforated cylindrical filter manifold 72. The manifolds 72 are each received centrally through one of the cartridge filters 12, thus mounting the filters 12 within the housing 56. In order to seal off the opposite ends of the cartridge filters 12, an expanded coil compression spring 74 is provided about each manifold 72 below the corresponding filter 12, a felt seal 76 and washer 78 being interposed between the spring 74 and the bottom of the filter 12. The lower end of the spring 74 bears either against the upper end of the mount 70 or against a stop fixed to the manifold 72, with the spring freely pressing the filter 12 upwardly.

The upper end of each filter 12 is normally urged above the top of the cylindrical wall 60 with the manifold 72 projecting thereabove and having a felt seal 80 engaged with the upper end of the filter 12 about the manifold 72.

The dome 58 includes a flat manifold retaining plate 82 welded to the lower periphery thereof forming in effect a closed dome. This retaining plate 82 has a plurality of apertures therethrough, each receiving the upper end portion of one of the manifolds 72, thereby, in conjunction with the mounts 70, properly orientating and stabilizing the manifolds 72 and consequently the filters 12. The dome at the same time forms an enlarged common manifold communicated with the filter manifolds 72. As such, the plate 82, upon a clamping of the dome 58 into position, will effect a resilient clamping of the filters 12 between the plate 82 and the springs 74, the seals 76 and 80 being compressed against the opposite ends of these cartridge filters 12 so as to effect the sealing thereof.

From FIGURE 5, it will be noted that housing 46 can, if desired, be provided with an enlarged base 84 and pedestal 86. It should be noted that this housing 56 can be modified so that it, too, can be used as a revivifying unit by adding a steam coil at the bottom and condensing method similar to that shown in FIGURE 4 by adding a side pipe and valve to outlet pipe 66, leading to a condenser similar to condenser 54 and a separating apparatus and solvent reservoir, not shown.

While the foregoing describes a preferred embodiment of the invention, it will be appreciated that such is for purposes of illustration and not limitation, and various modifications can be resorted to, insofar as the details of construction of the apparatus are concerned, within the scope of the instant invention.

What is claimed is:

1. Apparatus for revivifying cleaning fluid filters by treating them with vaporized solvent comprising an enclosed tank, a hinged removable cover thereon, a spring biased clamp to hold said cover in closed position, heater means within the bottom portion of said tank, means for removably supporting a plurality of filters within said tank in spaced relation above said heater means, a sludge chamber in said tank below said heater means, drain means for removing sludge from said sludge chamber, and condensing coil adjacent the top of said tank below said removable cover, said coil being nested in an annular chamber, a valve controlled discharge pipe communicating with said annular chamber, said discharge pipe extending to a separator having a first valve controlled discharge line returning to said tank and a second valve controlled discharge line running to an external reservoir, a drain in said separator to carry off separated water.

2. The apparatus of claim 1 in which the heating means is comprised of steam coils mounted within the bottom of said tank.

3. The apparatus of claim 1 in which the removal supporting means is a perforated plate mounted transversely across the tank above the heating means.

References Cited

UNITED STATES PATENTS

| | | | |
|---|---|---|---|
| 118,668 | 9/1871 | Adamson | 202—169 X |
| 360,996 | 4/1887 | Buttner | 202—168 X |
| 1,043,305 | 11/1912 | Duensing | 202—191 X |
| 1,938,841 | 12/1933 | Koch | 202—169 |
| 2,385,564 | 9/1945 | Booth et al. | 202—170 |
| 3,111,952 | 11/1963 | Roehl | 134—105 |
| 3,154,084 | 10/1964 | McKee | 134—108 X |
| 3,232,594 | 2/1966 | Ord | 202—170 |

NORMAN YUDKOFF, *Primary Examiner.*

D. EDWARDS, *Assistant Examiner.*